(12) United States Patent
Takebe et al.

(10) Patent No.: US 7,769,234 B2
(45) Date of Patent: Aug. 3, 2010

(54) RULED LINE EXTRACTING PROGRAM, RULED LINE EXTRACTING APPARATUS AND RULED LINE EXTRACTING METHOD

(75) Inventors: Hiroaki Takebe, Kawasaki (JP); Katsuhito Fujimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 916 days.

(21) Appl. No.: 11/607,758

(22) Filed: Nov. 30, 2006

(65) Prior Publication Data

US 2008/0056576 A1    Mar. 6, 2008

(30) Foreign Application Priority Data

Aug. 31, 2006    (JP) .............................. 2006-235660

(51) Int. Cl.
*G06K 9/46* (2006.01)
(52) U.S. Cl. .................. 382/190; 382/173; 382/162
(58) Field of Classification Search ................ 382/190, 382/192, 199, 163, 180, 175, 302, 173, 162; 358/403; 715/228
See application file for complete search history.

(56) References Cited

U.S. PATENT DOCUMENTS

| | | | |
|---|---|---|---|
| 6,813,381 B2 * | 11/2004 | Ohnishi et al. .............. | 382/192 |
| 7,522,766 B2 * | 4/2009 | Ishidera ...................... | 382/165 |

FOREIGN PATENT DOCUMENTS

| | | | |
|---|---|---|---|
| JP | 06150056 | * | 5/1994 |
| JP | 10-049676 | | 2/1998 |

OTHER PUBLICATIONS

Fujimoto et al., "A Ruled-Line Extraction Method for Digital Camera Images", IEEE, 2001, pps. 297-301.*

* cited by examiner

*Primary Examiner*—Anh Hong Do
(74) *Attorney, Agent, or Firm*—Greer, Burns & Crain, Ltd.

(57) ABSTRACT

A ruled line extracting apparatus, a ruled line extracting program and a ruled line extracting method re-extract a ruled line by changing the predetermined requirements to be met by ruled line s when a ruled line candidate extracted according to the requirements shows a low reliability. A ruled line extracting program that causes a computer to extract a ruled line in an image of a document comprises an extraction step that extracts a ruled line candidate from the image of a document according to the first requirement predefined to be met by the figures of the elements of the ruled lines, a judgment step that judges if the ruled line candidate is stable or unstable according to the structural stability of the ruled line candidate extracted in the extraction step, a requirement determination step that determines the second requirement to be met by the figures of the elements of the ruled line different from the first requirement according to the ruled line candidate judged as stable in the judgment step and the first requirement and a re-extraction step that re-extracts a ruled line candidate according to the second requirement determined in the requirement determination step.

20 Claims, 12 Drawing Sheets

RULED LINE EXTRACTING PROGRAM, RULED LINE EXTRACTING APPARATUS AND RULED LINE EXTRACTING METHOD

BACKGROUND OF THE INVENTION

1. Field of the Invention

This invention relates to a ruled line extracting program, a ruled line extracting apparatus and a ruled line extracting method that extract a ruled line out of an image of a document.

2. Description of the Related Art

Known techniques that extract a broken ruled line from an image of a document that typically shows a slip include those adapted to select candidates of broken line elements (broken line element candidates) from link components of black pixels on the basis of the sizes and the profiles such as aspect ratios thereof and consolidate the broken line candidate elements according to the distances separating the broken line element candidates and the drifts (the vertical drifts in the case of a horizontal ruled line) of the broken line element candidates (see, for example, Patent Document 1: Jpn. Pat. Appln. Laid-Open Publication No. 9-319824). Fixed values are used by such techniques as threshold values for size and profile when selecting broken line element candidates and also as threshold values for distance and drift when consolidating broken line element candidates. Known techniques that estimate a threshold value include those adapted to estimate a threshold value by means of a histogram prepared from the entire image of a document (see, for example, Patent Document 2: Jpn. Pat. Appln. Laid-Open Publication No. 10-49676).

However, the threshold values of sub-processes of known broken ruled line extracting processes are fixed values as pointed out above and known broken ruled line extracting processes are designed to serially connect sub-processes. In other words, only broken ruled lines that satisfy the requirements of threshold values are extracted and a broken ruled line is not extracted if it does not satisfy only one of the requirements of threshold values. Conversely, noises that satisfy the requirements will erroneously be extracted as broken ruled line.

A technique of hypothetically generating every possible broken ruled line candidate by loosely defining threshold values and verifying if the candidate meets the requirements of being a broken ruled line or not so that only a right broken ruled line may be extracted is conceivable. However, if hypothetically generated candidates are simply sieved, a part of a broken ruled line that is over-consolidated with noises and a broken ruled line that is over-consolidated with another broken ruled line can be eliminated as being not a broken ruled line. Particularly, it is a serious problem for broken ruled lines extracted from color images that broken lines are over-consolidated with noises. Therefore, it is difficult for a process of extracting a broken ruled line that is formed by serially connecting sub-processes using fixed values as threshold values to highly accurately extract a broken ruled line.

SUMMARY OF THE INVENTION

In view of the above-identified problem, it is therefore an object of the present invention to provide a ruled line extracting program, a ruled line extracting apparatus and a ruled line extracting method that extract a ruled line by using appropriate requirements.

According to the present invention, the above object is achieved by providing a ruled line extracting program that causes a computer to extract a ruled line in an image of a document. The program comprises: an extraction step that extracts a ruled line candidate from the image of a document according to a first requirement predefined to be met by figures of elements of the ruled lines; a judgment step that judges if the ruled line candidate is stable or unstable according to a structural stability of the ruled line candidate extracted in the extraction step; a requirement determination step that determines a second requirement to be met by the figures of the elements of the ruled line different from the first requirement according to the ruled line candidate judged as stable in the judgment step and the first requirement; and a re-extraction step that re-extracts a ruled line candidate according to the second requirement determined in the requirement determination step.

In another aspect of the present invention, there is provided a ruled line extracting apparatus that extracts a ruled line in an image of a document. The apparatus comprises: an extraction section that extracts a ruled line candidate from the image of a document according to a first requirement predefined to be met by figures of elements of the ruled lines; a judgment section that judges if the ruled line candidate is stable or unstable according to a structural stability of the ruled line candidate extracted by the extraction section; a requirement determination section that determines a second requirement to be met by the figures of the elements of the ruled line different from the first requirement according to the ruled line candidate judged as stable by the judgment section and the first requirement; and a re-extraction section that re-extracts a ruled line candidate according to the second requirement determined by the requirement determination section.

In still another aspect of the present invention, there is provided a ruled line extracting method of extracting a ruled line in an image of a document. The method comprises: an extraction step that extracts a ruled line candidate from the image of a document according to a first requirement predefined to be met by figures of elements of the ruled lines; a judgment step that judges if the ruled line candidate is stable or unstable according to a structural stability of the ruled line candidate extracted in the extraction step; a requirement determination step that determines a second requirement to be met by figures of elements of the ruled line different from the first requirement according to the ruled line candidate judged as stable in the judgment step and the first requirement; and a re-extraction step that re-extracts a ruled line candidate according to the second requirement determined in the requirement determination step.

Thus, according to the present invention, it is now possible to extract a ruled line by using appropriate requirements.

DETAILED DESCRIPTION OF THE PREFERRED EMBODIMENTS

Now, an embodiment of the present invention will be described in greater detail by referring to the accompanying drawings.

Firstly, the configuration of the embodiment of ruled line extracting apparatus will be described below.

Figure 1:
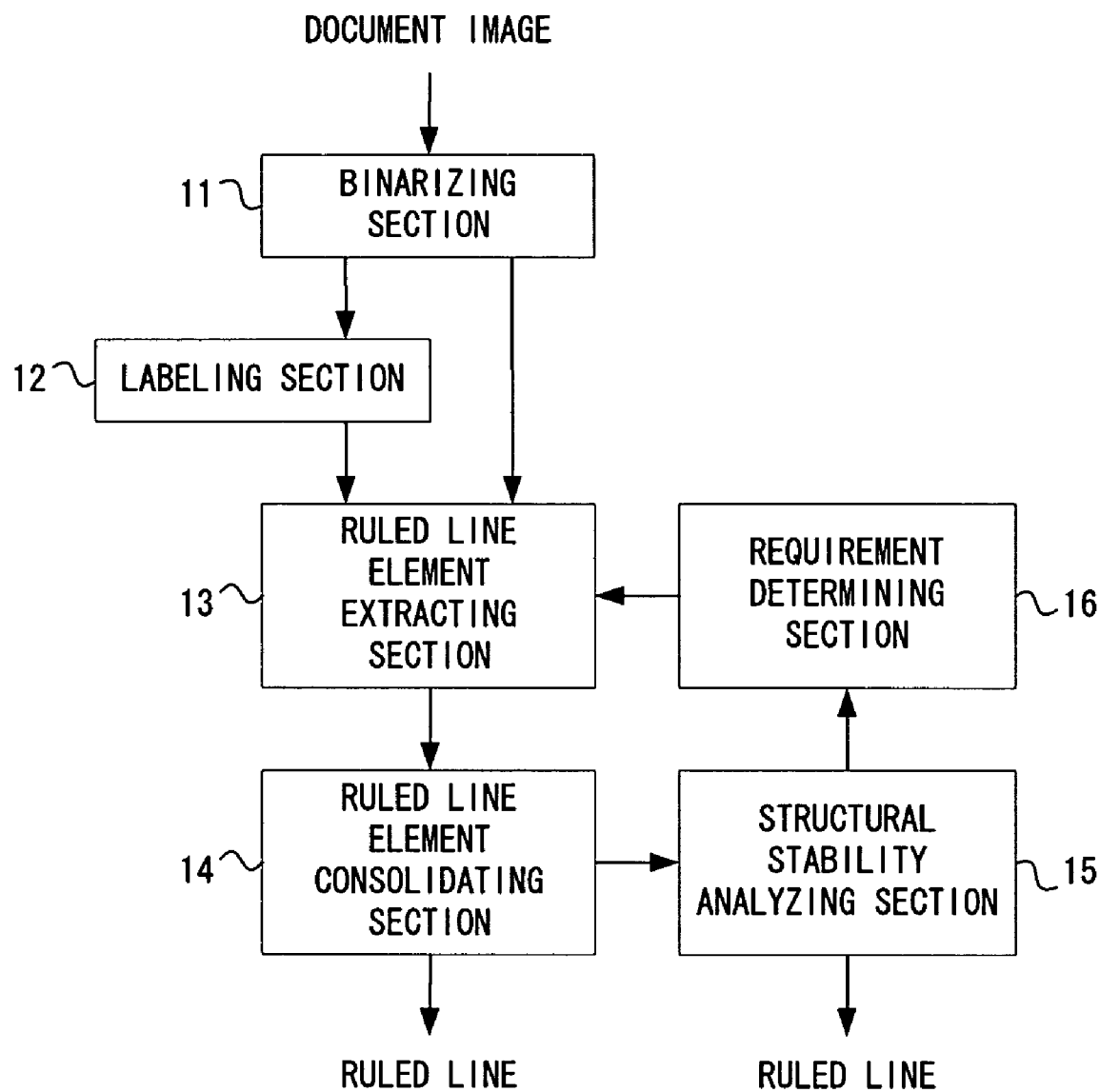
FIG. 1 is a schematic block diagram of an embodiment of ruled line extracting apparatus according to the present invention, showing the configuration thereof.

FIG. 1 is a schematic block diagram of the embodiment of ruled line extracting apparatus, showing the configuration thereof. The ruled line extracting apparatus comprises a binarizing section 11, a labeling section 12, a ruled line element extracting section 13, a ruled line element consolidating section 14, a structural stability analyzing section 15 and requirement determining section 16. The ruled line extracting apparatus is adapted to extract a ruled line from an input document image (a color document image or a binary document image), executing a broken ruled line extraction process that extracts a broken ruled line and a ruling solid line extraction process that extracts a ruling solid line.

Firstly, the operation of the broken ruled line extraction process of this embodiment will be described below.

Figure 2:
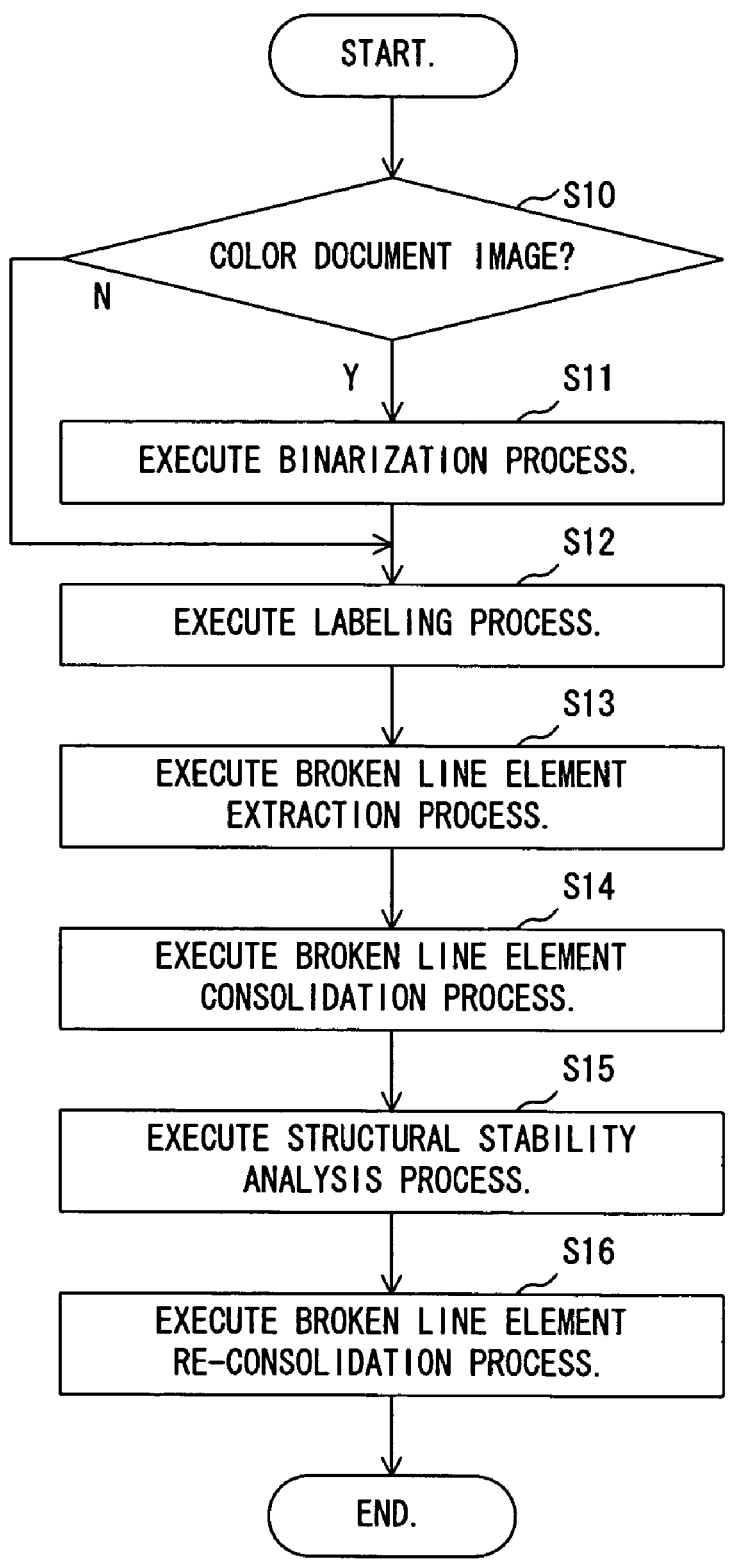
FIG. 2 is a flowchart of the operation of the broken ruled line extraction process of the embodiment of FIG. 1.

FIG. 2 is a flowchart of the operation of the broken ruled line extraction process of this embodiment. Referring to FIG. 2, as a color document image or a binary document image is input to the ruled line extracting apparatus, the binarizing section 11 judges if the input document image is a color document image or not (S10). If a color document image is input (S10, Y), the binarizing section 11 executes a binarization process of transforming the color document image into a binary document image (S11) and then operation proceeds to the processing S12. If, on the other hand, a binary document image is input (S10, N), the binarizing section 11 does not do anything and operation proceeds to the processing S12.

Then, the labeling section 12 executes a labeling process on the binary document image to extract black pixel link components (S12). Then, the ruled line element extracting section 13 executes a broken line element extraction process of extracting black pixel link components that satisfy a predefined threshold parameter requirement (the first requirement) as broken line elements (ruled line elements) from the set of the black pixel link components (S13). Then, the ruled line element consolidating section 14 executes a broken line element consolidation process of consolidating a plurality of broken line elements that satisfy the threshold parameter requirement (the first requirement) out of the broken line elements and selecting broken ruled line candidates (ruled line candidates) that satisfy a threshold requirement relating to the number of broken line elements out of the set of the consolidated broken line elements (S14).

Thereafter, the structural stability analyzing section 15 executes a structural stability analysis process of analyzing the structural stability of the broken ruled line candidates and judging if each of the broken ruled line candidates is stable or unstable (S15). Then, the requirement determining section 16 computationally determines a new threshold parameter (the second requirement) for the broken ruled line candidates that are judged to be unstable and the ruled line element extracting section 13 and the ruled line element consolidating section 14 execute a broken line element re-consolidation process of extracting and consolidating broken line elements as in the processing S13, S14 (S16) to end the flow. The broken ruled line candidates that are judged to be stable as a result of the structural stability analysis process and the broken ruled line candidates obtained as a result of the broken line element re-consolidation process are output as broken ruled line.

Now, the parameter relating to broken line elements and broken ruled line candidates will be described below.

A black pixel ink component size that is the length of a black pixel link component in the x-direction and the y-direction is employed as parameter (element parameter) for extracting broken line elements. Additionally, an inter-broken line element gap that is the gap separating two adjacently located broken line elements as viewed in the consolidating direction, a broken line element drift that is the drift of the centers of two broken line elements to be consolidated in the direction perpendicular to the direction of consolidation and a broken line element number that is the number of broken line elements included in a broken ruled line candidate are used as parameters for consolidating broken line elements (consolidation parameters). A black pixel link component size threshold value, an inter-broken line element gap threshold value, a broken line element drift threshold value and a number of broken line elements threshold value are provided as threshold parameters (parameter ranges) for the above parameters.

Figure 3:
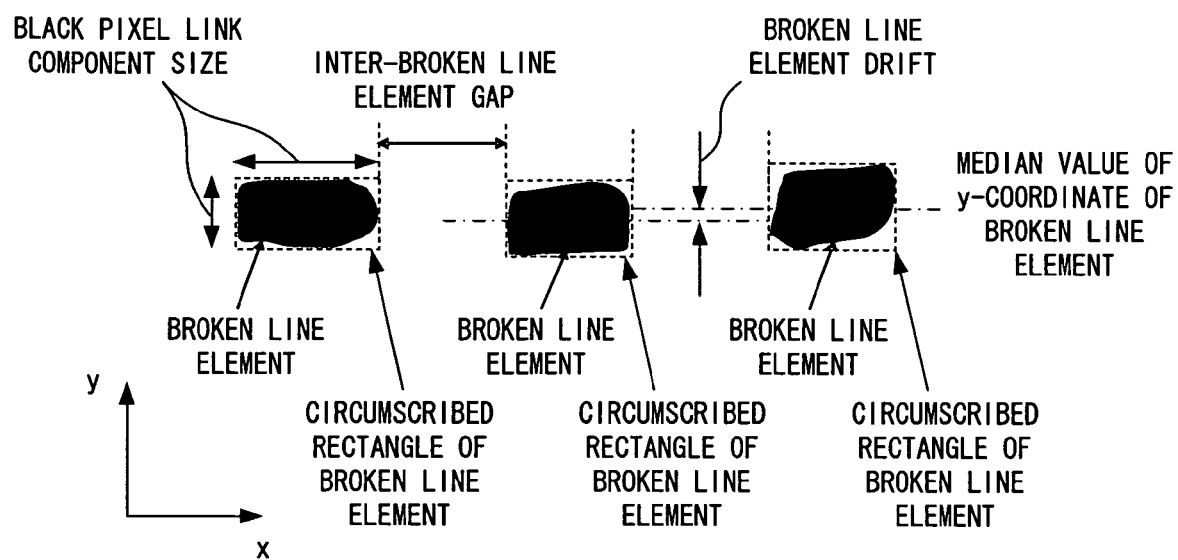
FIG. 3 is a binary document image illustrating the definitions of the parameters that are used by the embodiment of FIG. 1.

FIG. 3 is a binary document image illustrating the definitions of the parameters that are used by this embodiment. The black regions in FIG. 3 are black pixel link components. The black pixel link components in FIG. 3 are broken line elements. The length in the x-direction and the length in the y-direction of each black pixel link component indicate the size of the black pixel link component. The rectangle surrounding each black pixel link component is the circumscribed rectangle of the broken line element. The gap separating two circumscribed rectangles that are adjacently located relative to each other in the x-direction is the inter-broken line element gap. The dotted chain line running through the broken line elements in the x-direction represents the y-coordinate median of the broken line elements and the difference of the y-coordinate medians of two broken line elements that are adjacently located relative to each other in the x-direction is the broken line element drift.

In the broken line element extraction process, a black pixel link component whose size is not larger than the black pixel link component size threshold value is judged to be a broken line element. In the broken line element consolidation process, two broken line elements whose inter-broken line element gap is not larger than the inter-broken line element gap threshold value and whose broken line element drift is not greater than the broken line element drift threshold value are consolidated. A set of broken line elements whose number of consolidated broken line elements is not smaller than the broken line element number threshold value is judged to be a broken ruled line candidate.

Now, the structural stability analysis process for a broken ruled line candidate will be described below.

Figure 4:
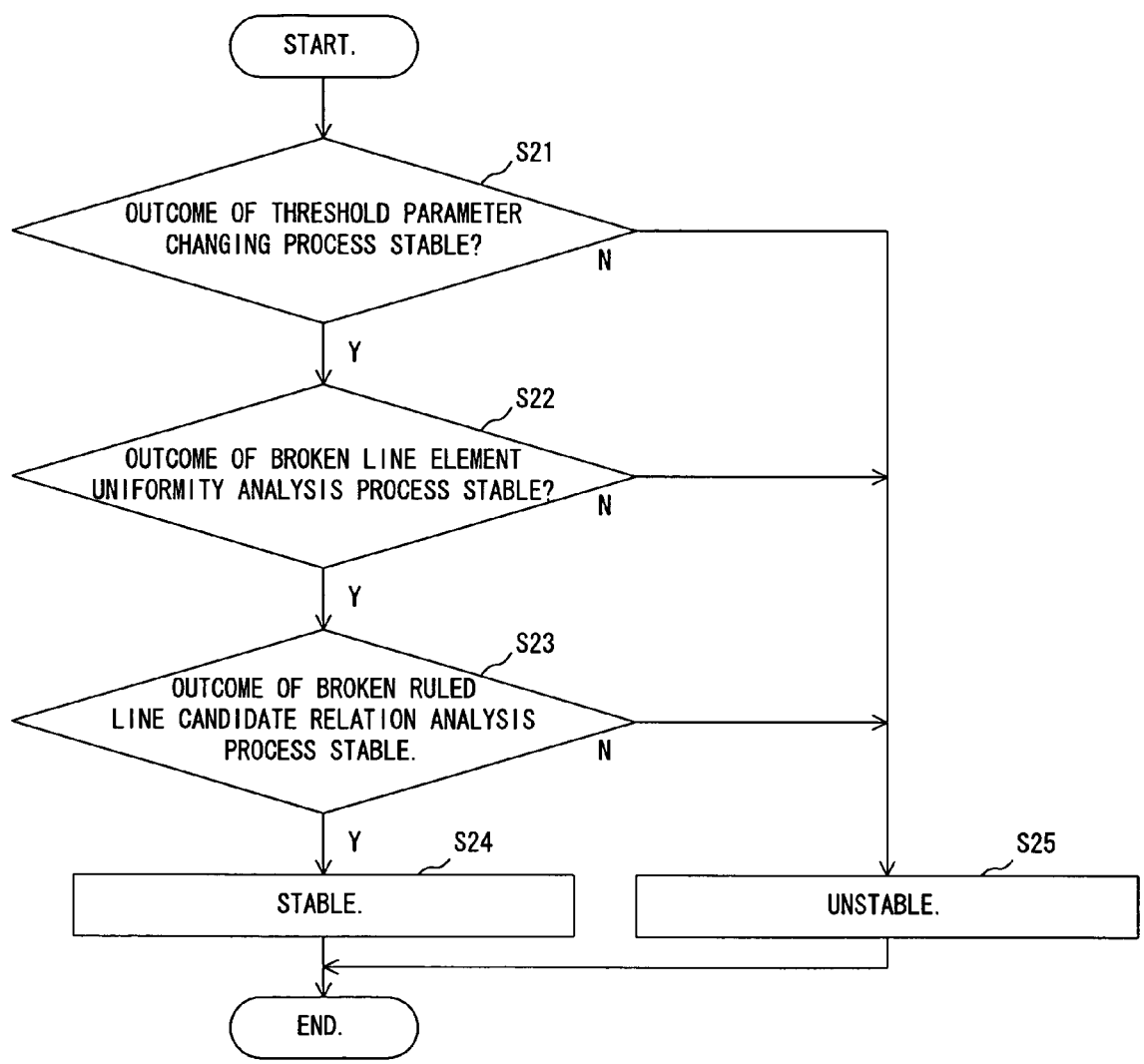
FIG. 4 is a flowchart of the operation of the structural stability analysis process of the embodiment of FIG. 1.

FIG. 4 is a flowchart of the operation of the structural stability analysis process of this embodiment. Referring to FIG. 4, the structural stability analyzing section 15 selects a broken ruled line candidate and executes a threshold parameter changing process of analyzing the stability of the selected broken ruled line candidate when the threshold parameter is made to change for the selected broken ruled line candidate to see if the outcome of the process indicates stability or not (S21). The structural stability analyzing section 15 proceeds to the processing S22 when the outcome of the process indicates stability (S21, Y), whereas it proceeds to the processing S25 when the outcome of the process indicates instability (S21, N). Then, the structural stability analyzing section 15 executes a broken line element uniformity analysis process of analyzing the stability of uniformity of the broken line elements constituting the selected broken ruled line candidate to see if the outcome of the process indicates stability or not (S22). The structural stability analyzing section 15 proceeds to the processing S23 when the outcome of the process indicates stability (S22, Y), whereas it proceeds to the processing S25 when the outcome of the process indicates instability (S22, N). Subsequently, the structural stability analyzing section 15 executes a broken ruled line candidate relation analysis process on the selected broken ruled line candidate to analyze the stability thereof from the relative relations among the broken ruled line candidates to see if the outcome of the process indicates stability or not (S23). The structural stability analyzing section 15 proceeds to the processing S24 when the outcome of the analysis indicates stability (S23, Y), whereas it proceeds to the processing S25 when the outcome of the process indicates instability (S23, N).

In the processing S24, the structural stability analyzing section 15 judges that the broken ruled line candidate to be stable and ends the flow of operation. In the processing S25, the structural stability analyzing section 15 judges the broken ruled line candidate to be unstable and ends the flow. In other words, a broken ruled line candidate is judged to be stable when all the outcomes of the threshold parameter changing process, the broken line element uniformity analysis process and the broken ruled line candidate relation analysis process indicate stability.

Now, the threshold parameter changing process will be described below.

Figure 5:
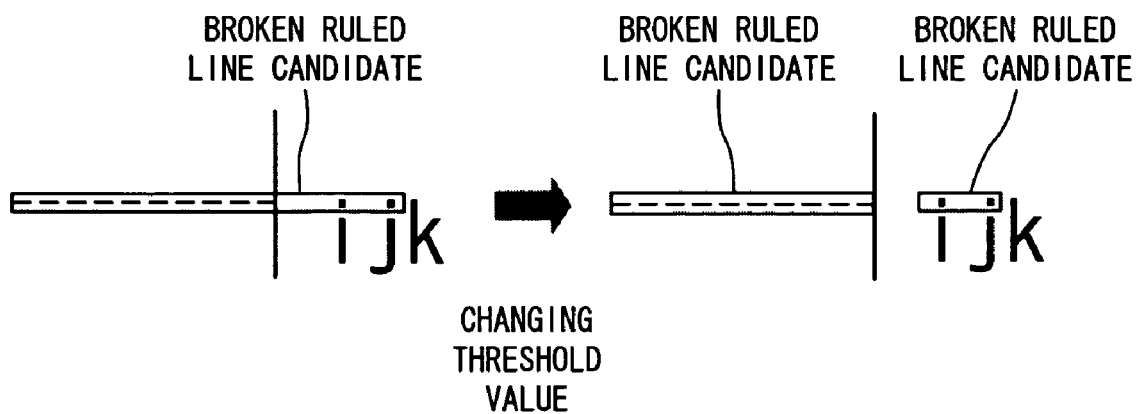
FIG. 5 is a binary document image showing the outcome of the threshold parameter changing process of the embodiment of FIG. 1.

The inter-broken line element gap threshold value that is a threshold parameter for the inter-broken line element gap will be described here. Firstly, the structural stability analyzing section 15 computationally determines each of the inter-broken line element gaps of the broken line elements of the broken ruled line candidates and then computes the average value. Then, the structural stability analyzing section 15 determines the internally dividing point of 1:1 between the original inter-broken line element gap threshold value (the first requirement) (used in the broken line element consolidation process) and the determined average value so as to use it as the inter-broken line element gap threshold value (the third requirement) for consolidating new broken line elements. For example, if the original inter-broken line element gap threshold value is th and the determined average value is a, (th+a)/2 is used as the new inter-broken line element gap threshold value. Then, the structural stability analyzing section 15 re-consolidates the broken ruled line candidates, using the new threshold parameter determined in this way, FIG. 5 is a binary document image showing the outcome of the threshold parameter changing process of this embodiment. Referring to FIG. 5, the binary document image shown at the left side indicates a broken ruled line candidate obtained by the threshold parameter before a change and the binary document image shown at the right side indicates two broken ruled line candidates obtained by the threshold parameter after the change. A broken ruled line candidate can be divided into a plurality of candidates as a result of re-consolidation using a new threshold parameter.

Then, the structural stability analyzing section 15 judges that the broken ruled line candidates constituted by not more than three broken line elements as unstable out of all the broken ruled line candidates. In FIG. 5, out of the two broken ruled line candidates after the change of the threshold parameter, the right one is judged to be unstable because it is constituted by two broken line elements.

Alternatively, it may be so arranged that the structural stability analyzing section 15 determines new threshold values for a plurality of threshold parameters including those for the black pixel link component size, the inter-broken line element gap, the broken line element drift and so on, subsequently extracts and consolidates broken line elements and judges each of the broken ruled line candidates as stable or unstable.

Now, the broken line element uniformity analysis process will be described below.

Figure 6:
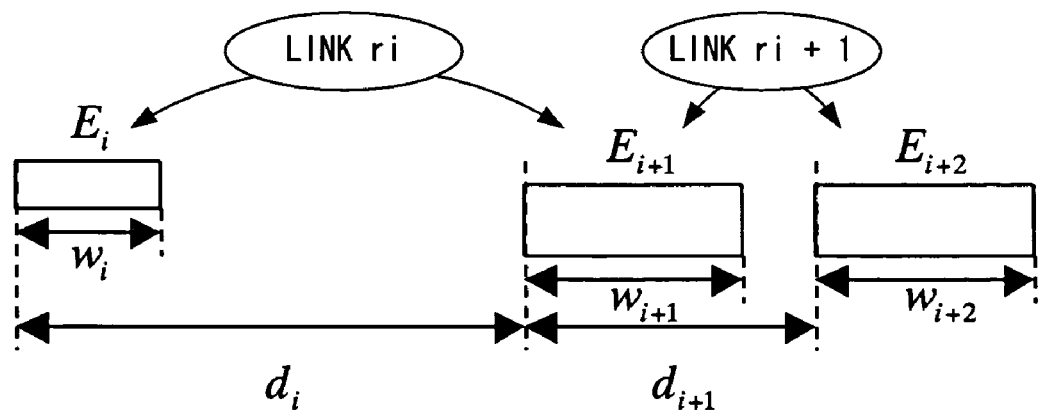
FIG. 6 is a conceptual illustration of a definition of link of the embodiment of FIG. 1.

The ruled line element consolidating section 14 holds link information as link to indicate the direction and the distance of two broken line elements that are located adjacently relative in all the broken line elements belonging to the same broken ruled line candidate. In the following description, two adjacently located broken line elements that belong to the same broken ruled line candidate are expressed as Ei and Ei+1 and the link between Ei and Ei+1 is expressed as ri. FIG. 6 is a conceptual illustration of a definition of link of this embodiment. Referring to FIG. 6, broken lines Ei, Ei+1 and Ei+2 are arranged from left to right and link ri that is information indicating the relationship between the broken line elements Ei and Ei+1 and link ri+1 that is information indicating the relationship between the broken line elements Ei+1 and Ei+2 are held. The broken line element lengths of the broken line elements Ei, Ei+1, Ei+2 that are their lengths as viewed in the direction of consolidation (x-direction) (the black pixel link component size in the direction of consolidation) are respectively wi, wi+1, wi+2. The definition of link contains that Ei is found to the left and Ei+1 is found to the right as viewed from the link ri and that the distance from the left end of the broken line element Ei to the left end of the broken line element Ei+1 is di. The definition of link also contains that Ei+1 is found to the left and Ei+2 is found to the right as viewed from the link ri+1 and that the distance from the left end of the broken line element Ei+1 to the left end of the broken line element Ei+2 is di+1.

The structural stability analyzing section 15 labels the links of each broken ruled line candidates. Thereafter, the structural stability analyzing section 15 judges the broken ruled line candidate as stable or unstable according to the outcome of the labeling operation.

Now, the operation of labeling a link will be described below.

The structural stability analyzing section 15 assigns label number j to the link ri when the link ri connecting the broken line elements Ei and Ei+1 does not satisfy both requirement A and requirement B shown below. Otherwise, the structural stability analyzing section 15 deletes the link ri and increments the label number j by one. The requirement A and the requirement B are expressed by the respective formulas shown below. Note that th_a=0.5 for instance.

Requirement A $$\min(di,di+1)/\max(di,di+1)=th\_a$$

Requirement B

A circumscribed rectangle that includes Ei and Ei+1 overlaps a circumscribed rectangle of the link components other than the broken line elements that has a size remarkably different from Ei out of all the circumscribed rectangles of the link components other than the broken line elements. In other words, if circumscribed rectangles of the link components other than the broken line elements overlap a circumscribed rectangle that includes Ei and Ei+1 and the size thereof is x, there is one that satisfies the formula below. Note that th_b=0.5 for instance.

$$\min(wi,x)/\max(wi,x)=th\_b$$

Figure 7:
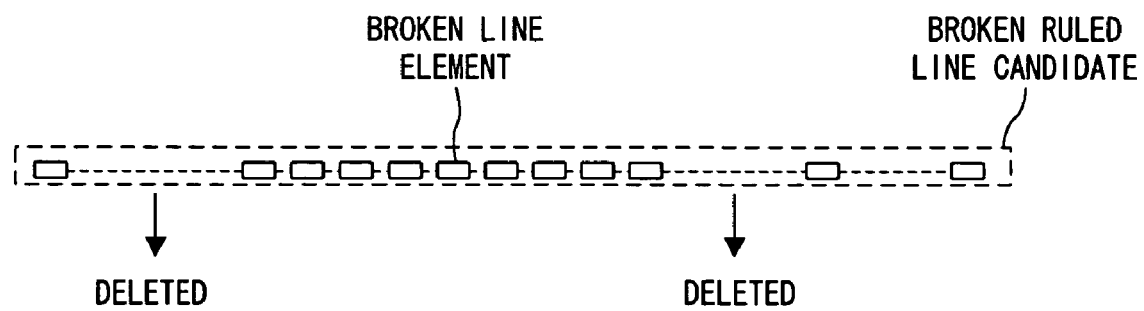
FIG. 7 is a binary document image showing the operation of deleting a link due to requirement A of the embodiment of FIG. 1.

FIG. 7 is a binary document image showing the operation of deleting a link due to the requirement A of this embodiment. FIG. 7 shows a broken ruled line candidate and a plurality of broken line elements constituting the candidate. The link that used to be found between broken line elements labeled as "deleted" is deleted because it does not satisfy the requirement A.

Figure 8:
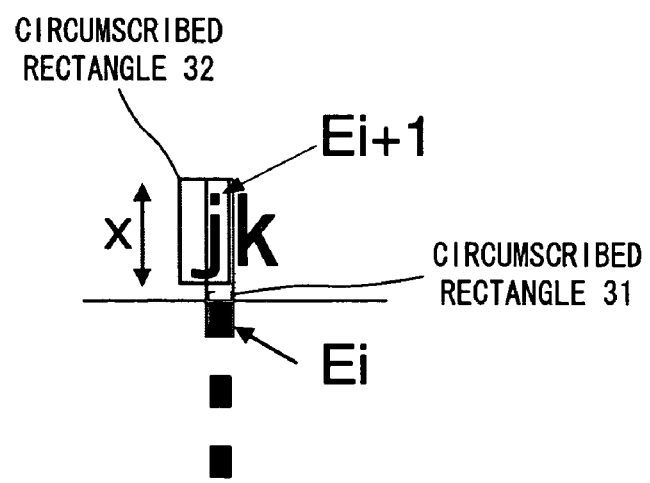
FIG. 8 is a binary document image showing the operation of deleting a link due to requirement B of the embodiment of FIG. 1.

FIG. 8 is a binary document image showing the operation of deleting a link due to the requirement B of this embodiment. Referring to FIG. 8, the circumscribed rectangle 31 is a circumscribed rectangle that includes the broken line elements Ei, Ei+1 and the circumscribed rectangle 32 is a circumscribed rectangle that includes the link components other than the broken line elements. The longitudinal length of the circumscribed rectangle 32 is x. The circumscribed rectangle 31 and the circumscribed rectangle 32 overlap each other and x is remarkably different from the longitudinal length of Ei. Thus, the link ri is deleted because it does not satisfy the requirement B.

Figure 9:
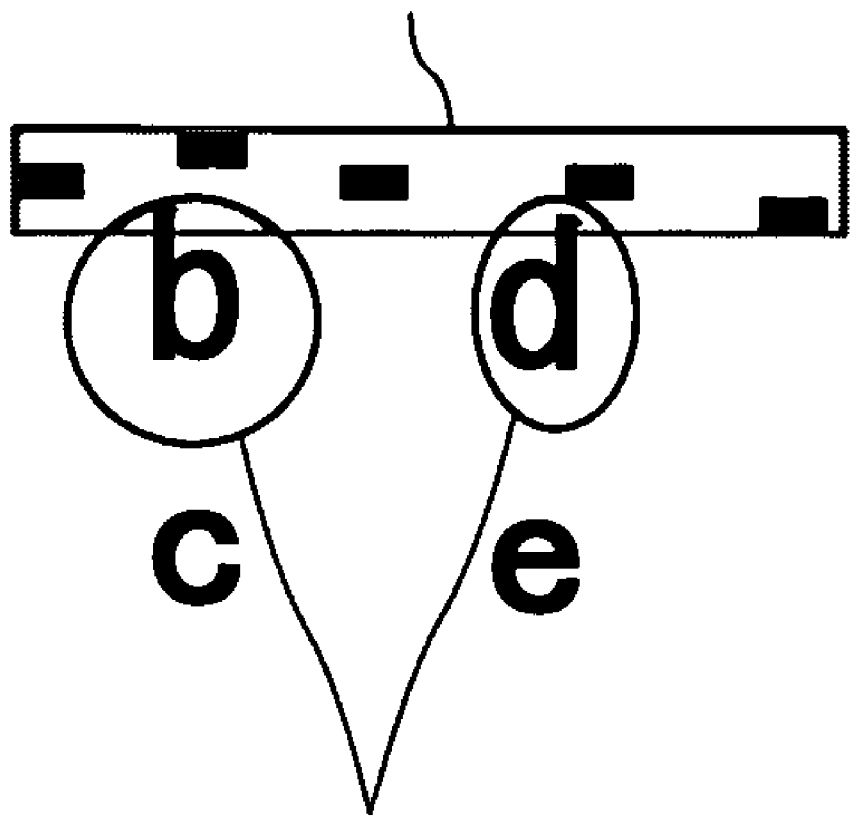
FIG. 9 is a binary document image showing the operation of the duplication judging process of the embodiment of FIG. 1.

An efficient technique for the process of checking if a circumscribed rectangle including Ei and Ei+1 overlaps a circumscribed rectangle including the link components other than the broken line elements (overlap judging process) will be described below. FIG. 9 is a binary document image showing the operation of the duplication judging process of this embodiment. Firstly, for broken ruled line candidate K, the structural stability analyzing section 15 extracts the black pixel link components other than the broken line elements of K that overlap circumscribed rectangles of K and defines the set of the black pixel link components as Sk. Then, the structural stability analyzing section 15 checks if a circumscribed rectangle that includes Ei and Ei+1 overlaps each circumscribed rectangle of Sk or not.

Then, if the number of broken line elements having the same label number in a broken ruled line candidate is not more than three, the structural stability analyzing section 15 judges the broken ruled line candidate as unstable.

Now, the broken ruled line candidate relation analysis process will be described below.

Firstly, if, for a broken ruled line candidate, the number of broken ruled line candidates other that itself that satisfy all the following requirements including requirement C, requirement D and requirement E is not less than t−1, the structural stability analyzing section 15 judges the broken ruled line candidate as stable. Note that a specific process on a broken ruled line candidate in the longitudinal direction (y-direction) will be discussed below.

Requirement C

The difference of the y-coordinates of the starting points of the broken ruled line candidates is not more than s pixels.

Requirement D

The difference of the y-coordinates of the ending points of the broken ruled line candidates is not more than s pixels.

Requirement E

The numbers of constituting broken line elements are equal to each other.

Figure 10:
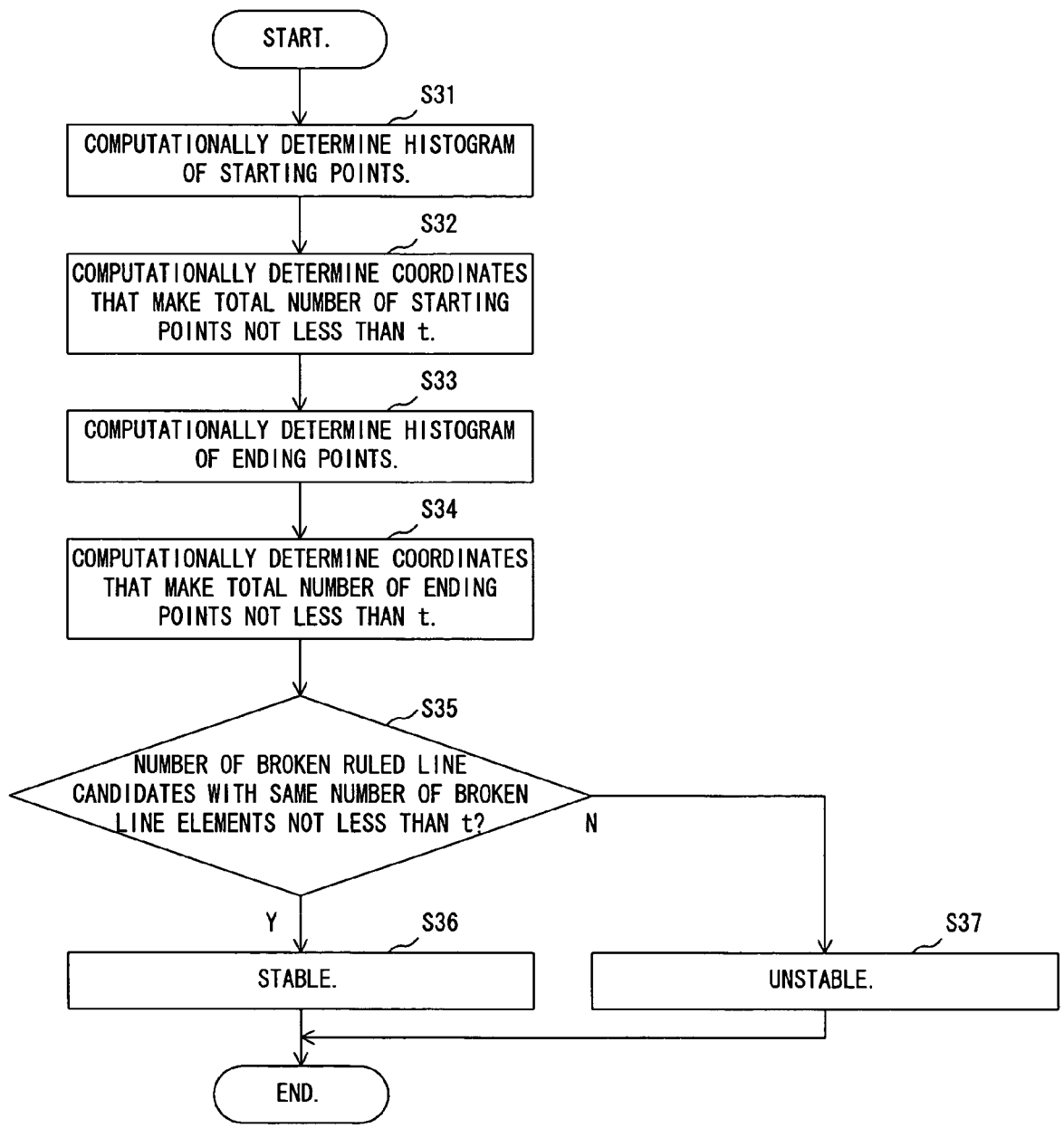
FIG. 10 is flowchart of the operation of the broken ruled line candidate relation analysis process of the embodiment of FIG. 1.
Figure 11:
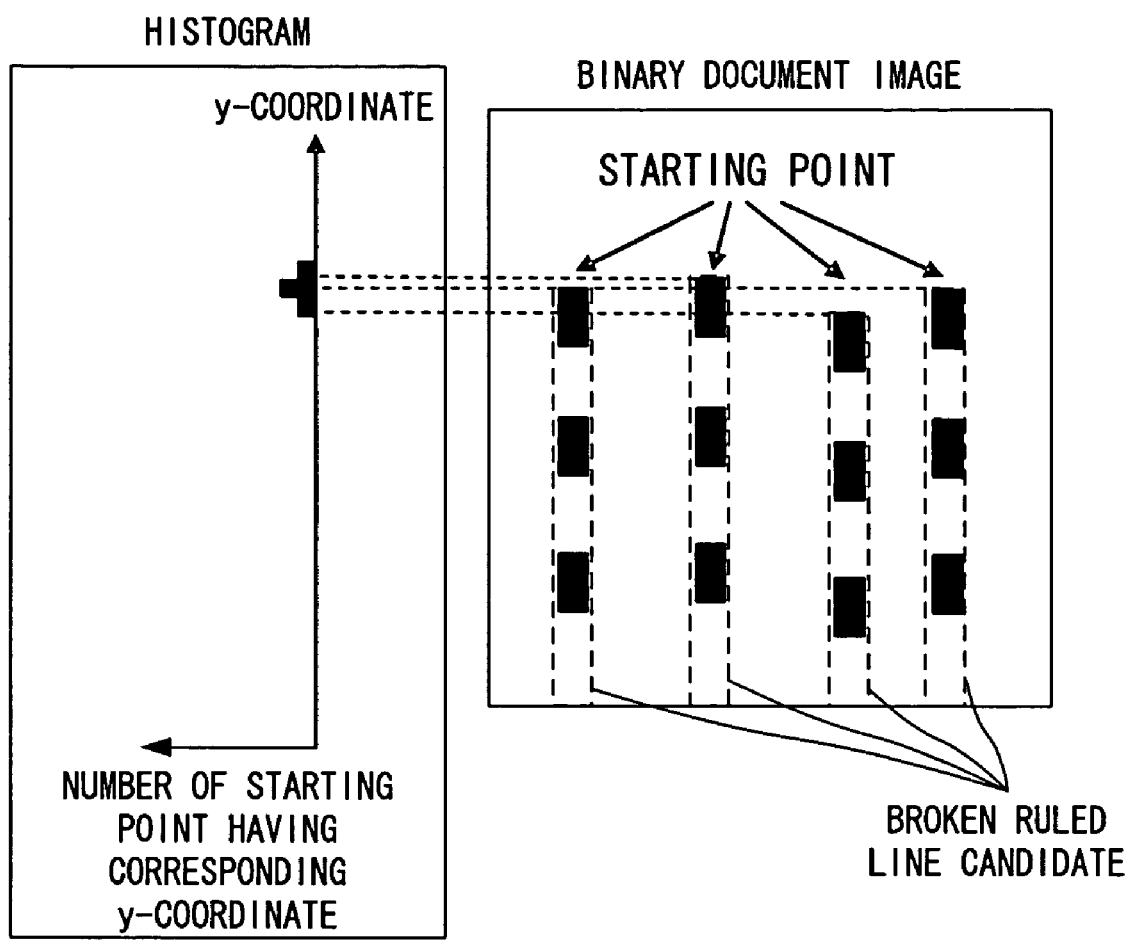
FIG. 11 is a binary document image showing the operation of the broken ruled line candidate relation analysis process of the embodiment of FIG. 1.

FIG. 10 is a flowchart of the operation of the broken ruled line candidate relation analysis process of this embodiment. Firstly, the structural stability analyzing section 15 computationally determines a histogram of the y-coordinates of the starting points of broken ruled line candidates (S31). FIG. 11 is a binary document image showing the operation of the broken ruled line candidate relation analysis process of this embodiment. In FIG. 11, a binary document image including a plurality of broken ruled line candidates in the longitudinal direction is shown at the right side, whereas a histogram of the number of broken line elements found at a y-coordinate is shown at the left side. In the histogram, the axis that is directed upward indicates the y-coordinate and the axis that is directed leftward indicates the number of starting points that corresponds to the y-coordinate.

Then, the structural stability analyzing section 15 determines the number of starting points found on the s consecutive pixels located in the vicinity of a y-coordinate in the histogram determined in the processing S31 and also the y-coordinate where the total number of starting points is not less than t (S32). Thereafter, the structural stability analyzing section 15 draws a histogram of the y-coordinates of ending points for the broken ruled lines having the y-coordinates determined in the processing S32 (S33). Then, the structural stability analyzing section 15 determines the y-coordinate where the total number of ending points found on the s consecutive pixels located in the vicinity of a y-coordinate is not less than t in the histogram determined in the processing S33 (S34). Subsequently, the structural stability analyzing section 15 determines the number of broken ruled line candidates having the same number of constituent broken line elements out of the broken ruled line candidates having the y-coordinate determined in the processing S34 and judges if the number is not less than t or not (S35). The structural stability analyzing section 15 determines them as stable broken ruled line candidates (S36) when the number is not less than t (S35, Y), whereas it determines them as unstable broken ruled line candidates (S37) when the number is less than t (S35, N) to end the flow. For instance, t=4, S=3.

While the process for the broken ruled line candidates in the longitudinal direction (y-direction) is described above, the process for the broken ruled line candidates in the transversal direction (x-direction) is similar to the above-described process.

Now, the broken line element consolidation process by means of consolidation parameter computations will be described below.

Figure 12:
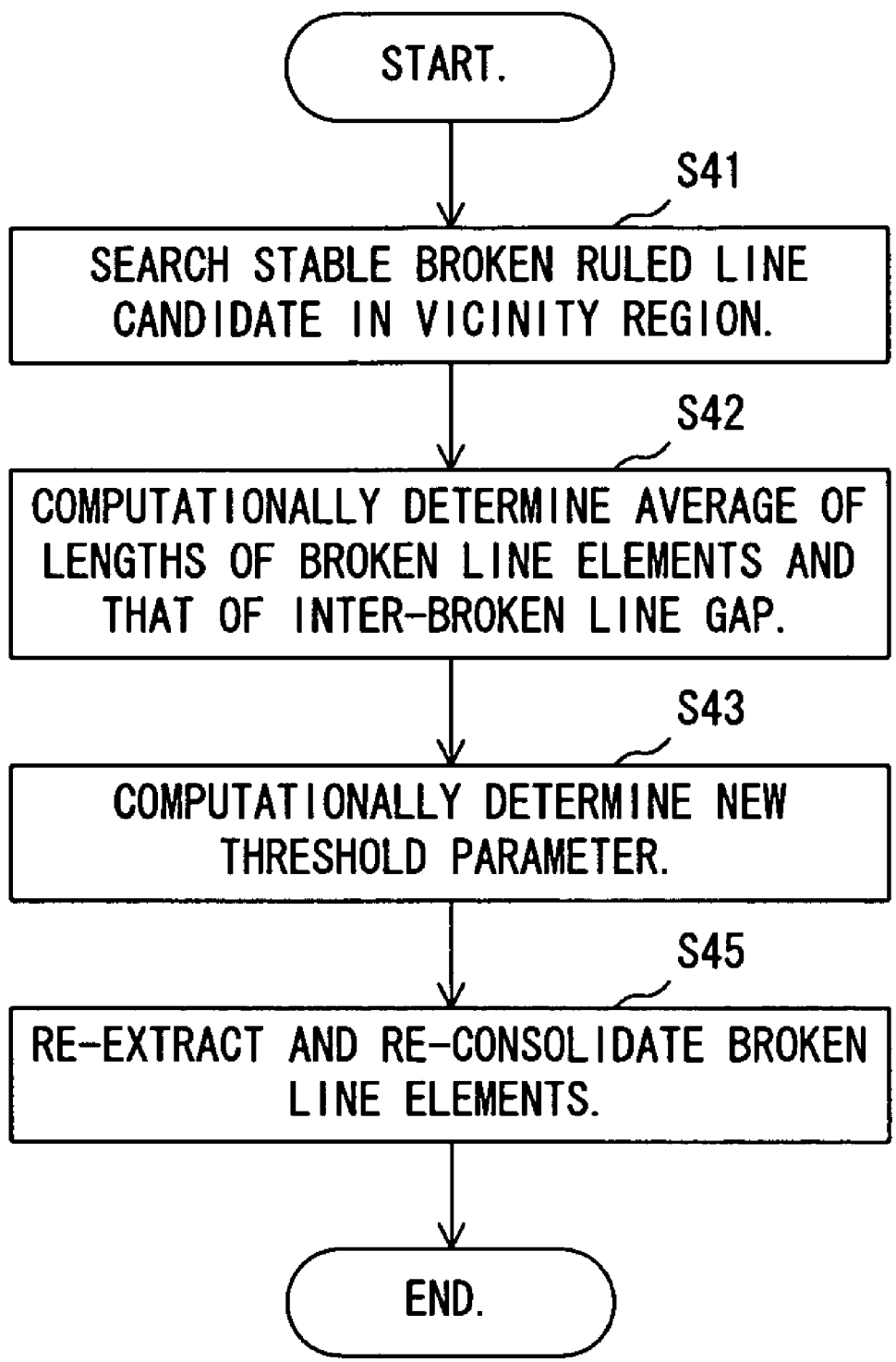
FIG. 12 is a flowchart of the operation of the broken line element re-consolidation process of the embodiment of FIG. 1.

In the broken line element consolidation process, the requirement determining section 16 determines an appropriate threshold parameter from the broken ruled line candidates in the vicinity for the broken ruled line candidate that are judged to be unstable as a result of the above-described structural stability analyzing process and the ruled line element extracting section 13 and the ruled line element consolidating section 14 re-extract and re-consolidate the broken line elements. FIG. 12 is a flowchart of the operation of the broken line element re-consolidation process of this embodiment.

Referring to FIG. 12, firstly the requirement determining section 16 defines a vicinity region for the unstable broken ruled line candidates and searches for stable broken ruled line candidates located in the vicinity region (S41). The vicinity region is a square region with a size equal to the character size×n, where n is a natural number and may be n=5 for instance. The requirement determining section 16 also searches for the closest broken ruled line candidate out of the stable broken ruled line candidates contained in the vicinity region.

Then, the requirement determining section 16 computationally determines the average value m_w of the broken line element lengths and the average value m_s of the inter-broken line gaps for the broken line elements included in the selected stable broken ruled line candidates (S42).

Assume that the original threshold parameter for the size of broken line element is th_w and the original threshold value for the inter-broken line element gap is th_s. Then, the internally dividing point of a predetermined ratio relative to th_w and m_w is defined as the new threshold value for the size of broken line element and the internally dividing point of a predetermined ratio relative to th_s and m_s is defined as the new threshold value for the inter-broken line element gap (S43). Now, assume that the new threshold value for the size of broken line element is (th_w+m_w)/2 and the new threshold value for the inter-broken line element gap is (th_s+m_s)/2. Then, the ruled line element extracting section 13 and the ruled line element consolidating section 14 re-extract and re-candidate broken line elements, using these threshold values (S45) to end the flow.

Now, the broken ruled line extraction process will be described by way of a specific example.

Figure 13:
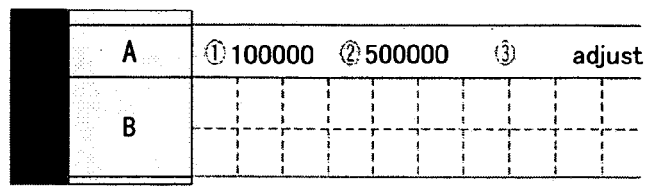
FIG. 13 is a slip image that is an object of the broken ruled line extraction process of the embodiment of FIG. 1.
Figure 14:
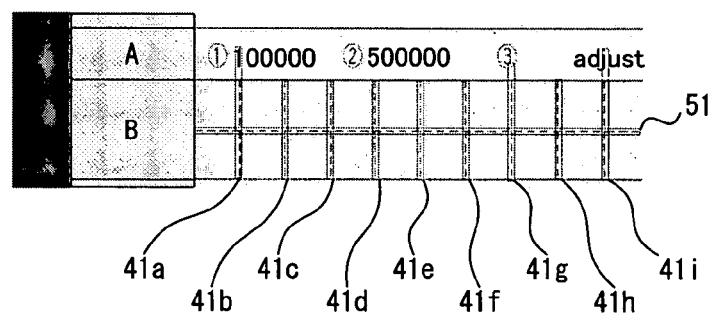
FIG. 14 is a slip image with broken ruled line candidates extracted by way of the broken line element consolidation process of the embodiment of FIG. 1.

An example of extracting a broken ruled line from a color slip image will be described here. FIG. 13 is a slip image that is an object of the broken ruled line extraction process of this embodiment. FIG. 14 is a slip image with broken ruled line candidates extracted by way of the broken line element consolidation process of this embodiment. FIG. 14 shows a broken ruled line candidates 41*a*, 41*b*, 41*c*, 41*d*, 41*e*, 41*f*, 41*g*, 41*h* and 41*i* in the longitudinal direction and a broken ruled line candidate 51 that are extracted from the slip image of FIG. 13 by the broken line element consolidation process. The broken ruled line candidates 41*a*, 41*g* and 41*i* are judged as unstable as a result of the structural stability analysis process out of these broken ruled line candidates.

Figure 15:
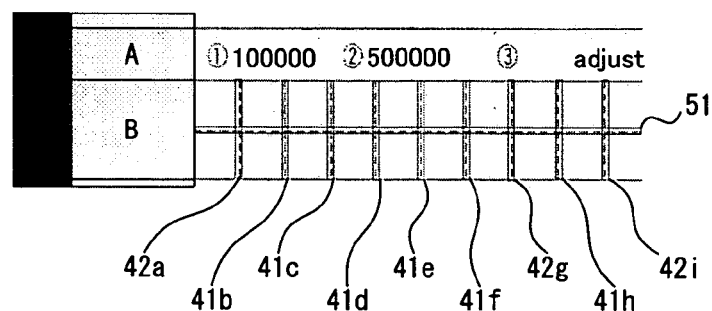
FIG. 15 is a slip image with broken ruled line candidates extracted by way of the broken line element re-consolidation process of the embodiment of FIG. 1.

FIG. 15 is a slip image with broken ruled line candidates extracted by way of the broken line element re-consolidation process of the embodiment. A new threshold parameter is computationally determined for an unstable broken ruled line candidate 41*a* and a broken ruled line candidate 42*a* is extracted on the basis of the parameters of the stable broken ruled line candidates 41*b*, 41*c* located in the vicinity of the broken ruled line candidate 41*a* by way of the broken line element re-consolidation process. Similarly, a new threshold parameter is computationally determined for an unstable broken ruled line candidate 41*g* and a broken ruled line candidate 42*g* is extracted on the basis of the parameters of the stable broken ruled line candidates 41*e*, 41*f*, 41*h* located in the vicinity of the broken ruled line candidate 41*g*. Likewise, a new threshold parameter is computationally determined for an unstable broken ruled line candidate 41*i* and a broken ruled line candidate 42*i* is extracted on the basis of the parameters of the stable broken ruled line candidate 41*h* located in the vicinity of the broken ruled line candidate 41*i*.

Now, the operation of the ruling solid line extraction process of this embodiment will be described below.

Figure 16:
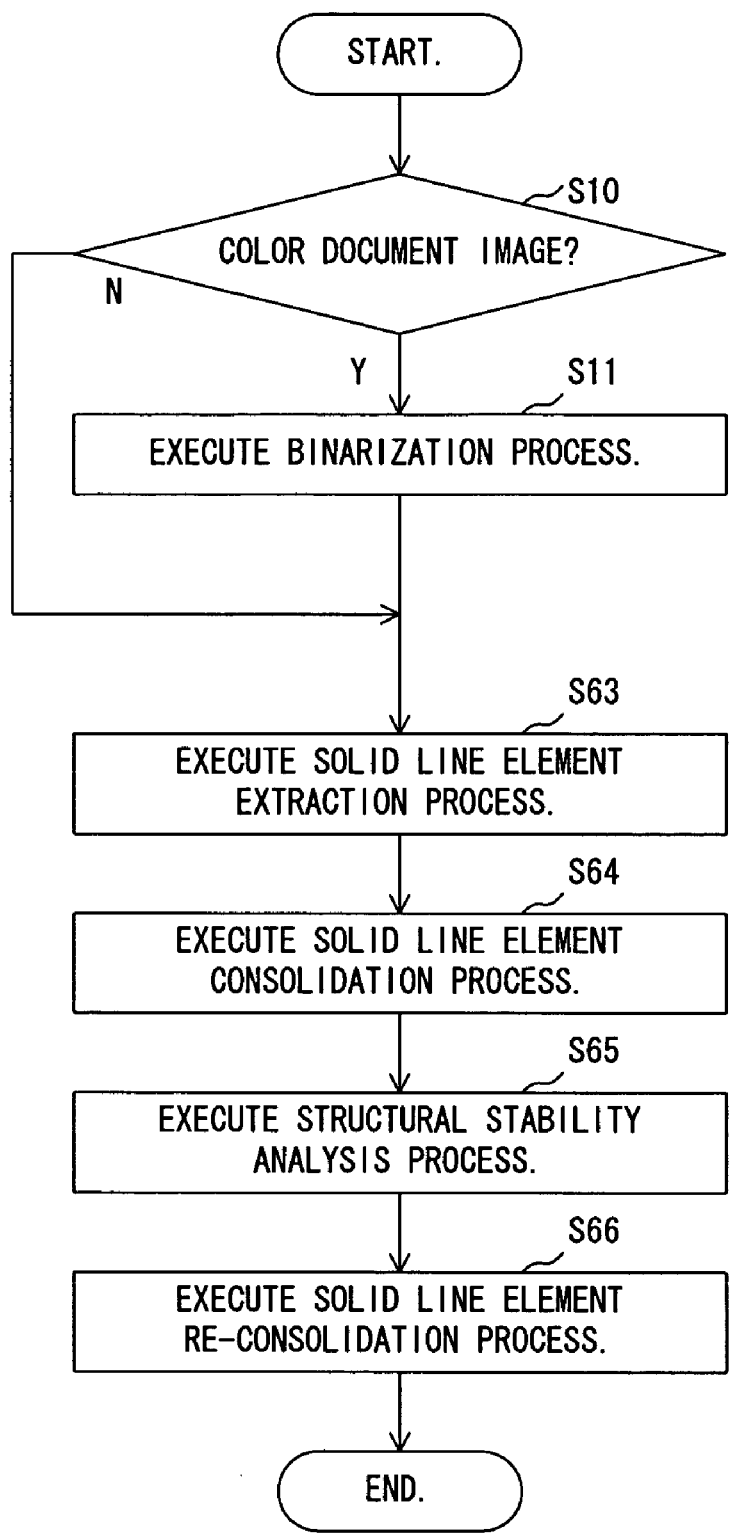
FIG. 16 is a flowchart of the operation of the ruling solid line extraction process of the embodiment of FIG. 1.

FIG. 16 is a flowchart of the operation of the ruling solid line extraction process of this embodiment. The flow of the ruling solid line extraction process is similar to that of the broken ruled line extraction process. Referring to FIG. 16, as a color document image or a binary document image is input to the ruled line extracting apparatus, the binarizing section 11 judges if the input document image is a color document image or not (S10) as in the case of the flow of the broken ruled line extraction process. If a color document image is input (S10, Y), the binarizing section 11 executes a binarization process of transforming the color document image into a binary document image (S11) and then the operation proceeds to the processing S12. If, on the other hand, a binary document image is input (S10, N), the binarizing section 11 does not do anything and the operation proceeds to the processing S63.

Then, the ruled line element extracting section 13 divides the image by means of a grating and determines the ratio of the black pixels (element parameter) contained in each of the grid regions. Then, it executes a solid line element extraction process of extracting the grid regions that show a value greater than a predetermined threshold value (black pixel ratio threshold value) as solid line elements (ruled line elements) (S63). Then, the ruled line element consolidating section 14 executes a solid line element consolidation process of consolidating the solid line elements and generating ruling solid line candidates (ruled line candidates) (S64).

Thereafter, the structural stability analyzing section 15 executes a structural stability analysis process of analyzing the structural stability of the ruling solid line candidates and judging if each of the ruling solid line candidates is stable or unstable (S65). More specifically, the structural stability analyzing section 15 executes a threshold parameter analysis process that is similar to the broken ruled line extraction process for the threshold value of the ratio of black pixels. More specifically, the structural stability analyzing section 15 determines the ratio of black pixels of each of the solid line elements that constitute each of the ruling solid line candidates and then computes the average value of all the solid line elements. Thereafter, the structural stability analyzing section 15 determines the internal dividing points of several predetermined ratios for the original threshold value and the average value and defines a new threshold value. Then, the structural stability analyzing section 15 executes a solid line element extraction process and a solid line element consolidation process, using the new threshold parameter. If the newly obtained ruling solid line candidate differ from the original ruling solid line candidate, the structural stability analyzing section 15 judges that the original ruling solid line candidate is unstable.

Then, the requirement determining section 16 computationally determines a new threshold parameter for the ruling solid line candidate that is judged as unstable and the ruled line element extracting section 13 and the ruled line element consolidating section 14 execute a solid line element reconsolidation process of reconsolidating the solid line elements as in the case of the processing of S64 (S66) to end the flow. More specifically, the ruled line element consolidating section 14 computationally determines a new threshold parameter from the stable ruling solid line candidates located around the unstable ruling solid line candidate and executes the solid line element extraction process and the solid line element consolidation process once again, using the new threshold parameter, as in the case of the broken line element re-consolidation process.

The ruling solid line candidates that are judged to be stable as a result of the structural stability analysis process and the ruling solid line candidates obtained as a result of the solid line element re-consolidation process are output as ruling solid line.

The ruled line extracting apparatus of this embodiment verifies the hypotheses obtained as interim results of a process, selects the right hypothesis from the generated hypotheses and feedbacks the information obtained as a result of the verification of the hypotheses. Then, it generates and selects right hypotheses. More specifically, the ruled line extracting apparatus of this embodiment judges the adequacy of the outcome of the process on the basis of the structural stability relative to parameters, adjusts the parameters according to the structural stability and executes the process once again.

With the above-described broken ruled line extraction process, when a pattern that forms a character is partly excessively consolidated with one or more than one broken line elements by error, the broken ruled line candidate is judged to be unstable and an appropriate threshold value is computationally determined from the stable broken ruled line candidates surrounding it. Then, a broken ruled line candidate is re-extracted on the basis of the threshold value and the pattern that forms a character is separated and deleted from the broken ruled line. When broken ruled lines are excessively consolidated by noises or the like, the broken ruled lines are separated from each other by a new threshold value and the noises are deleted from the broken ruled lines.

With the above-described broken ruled line extraction process, when a pattern that forms a character is partly excessively consolidated with one or more than one solid line elements by error, the pattern that forms a character is similarly separated and deleted from the ruling solid line by a new threshold value. When ruling solid lines are excessively consolidated by noises, the ruling solid lines are separated from each other by a new threshold vale and the noises are deleted from the ruling solid lines.

The extraction step corresponds to the broken line element extraction process or the solid line element extraction process of the embodiment. The judgment step corresponds to the structural stability analysis process of the embodiment. The requirement determination step corresponds to the processing S41, S42 and S43 of the embodiment. The re-extraction step corresponds to the processing S45 of the embodiment. The extraction section corresponds to the ruled line element extracting section and the ruled line element consolidating section of the embodiment. The judgment section corresponds to the structural stability analyzing section of the embodiment.

The ruled line extracting apparatus of this embodiment can be applied to an information processing apparatus without difficulty to enhance the performance of the information processing apparatus, which may be a PC (personal computer), a server, a scanner, a copying machine or a composite machine.

The present invention provides a ruled line extracting program that causes the computer that operates for the ruled line extracting apparatus to execute the above-described steps. The program can be executed by the computer that operates for the ruled line extracting apparatus when it is stored in a computer-readable recording medium. Such a computer-readable recording medium may be an internal storage device mounted in the computer such as a ROM or a RAM, a portable type storage medium such as a CD-ROM, a flexible disk, a DVD disk, a magneto-optical disk or an IC card, a database holding a computer program, some other computer and the database thereof.

What is claimed is:

1. A computer-readable medium storing a ruled line extracting program that causes a computer to execute a process to extract a ruled line in a document image of a document, the process comprising:

extracting a ruled line candidate from the document image by executing a labeling process on the document image and selecting the ruled line candidate which is a black pixel link component satisfying a first requirement predefined to be met by figures of elements of the ruled lines;

judging if the ruled line candidate is stable or unstable according to a structural stability of the ruled line candidate extracted in the extracting;

determining a second requirement to be met by the figures of the elements of the ruled line different from the first requirement according to the ruled line candidate judged as stable in the judging and the first requirement; and re-extracting a ruled line candidate according to the second requirement determined in the determining.

2. The computer-readable medium according to claim 1, wherein the first requirement includes a parameter range showing the range of an element parameter that indicates properties of a graphic to be selected as a ruled line element of the ruled line and/or the range of a consolidation parameter that indicates properties of the graphic of the ruled line element to be consolidated as ruled line candidate.

3. The computer-readable medium according to claim 2, wherein the extracting is adapted to select a graphic that makes the element parameter to be found within the corresponding parameter range from the document image and consolidate a plurality of ruled line elements that make the consolidation parameter to be found within the corresponding parameter range to generate the ruled line candidate.

4. The computer-readable medium according to claim 3, wherein the ruled line is a broken ruled line;

the parameter range of the element parameter is defined by a threshold value for sizes of circumscribed rectangles of the black pixel link components; and the extracting is adapted to extract the black pixel link components from the document image expressed by a binary system and select the black pixel link components that make the element parameter to be found within the corresponding parameter range as ruled line elements.

5. The computer-readable medium according to claim 3, wherein the ruled line is a broken ruled line;

the parameter range of the consolidation parameter is defined by a threshold value for a gap separating two ruled line elements, a threshold value for a drift in the direction perpendicular to the direction of consolidating two ruled line elements and/or a threshold value for the number of consolidated ruled line elements; and the extracting is adapted to select a plurality of ruled line elements that make the consolidation parameter to be found within the parameter range as ruled line candidate.

6. The computer-readable medium according to claim 3, wherein the ruled line is a solid ruled line; and the extracting is adapted to divide the document image expressed by a binary system into a plurality of regions, select regions that make the element parameter to be found within the parameter range out of the regions as ruled line elements and consolidate the ruled line elements to generate a ruled line candidate.

7. The computer-readable medium according to claim 2, wherein the judging defines a third requirement by changing the parameter range of the first requirement according to the parameters of the ruled line elements constituting the ruled line candidate, extracts an interim ruled line candidate from the document image according to the third requirement as in the extracting and judges the ruled line candidate extracted in the extracting as unstable when it differs from the interim ruled line candidate.

8. The computer-readable medium according to claim 2, wherein the judging defines the third requirement by changing the parameter range of the first requirement according to the parameters of the ruled line elements constituting the ruled line candidate, extracts an interim ruled line candidate from the document image according to the third requirement as in the extracting and judges the ruled line candidate extracted in the extracting as unstable when any of the ruled line elements constituting the interim ruled line candidate is not larger than a predetermined threshold value.

9. The computer-readable medium according to claim 2, wherein the judging judges the ruled line candidate as unstable when the positional arrangement of the ruled line elements included in the ruled line candidate is not uniform.

10. The computer-readable medium according to claim 2, wherein the judging judges the ruled line candidate as unstable when circumscribed rectangles of the ruled line elements constituting the ruled line candidate overlap circumscribed rectangles of black pixel link components other than the ruled line elements and having predetermined profiles.

11. The computer-readable medium according to claim 2, wherein the judging extracts a plurality of ruled line candidates uniformly arranged in the vertical direction and a plurality of ruled line candidates uniformly arranged in the horizontal direction as a group of regular ruled line candidates and judges the ruled line candidates other than the group of regular ruled line candidates as unstable.

12. The computer-readable medium according to claim 11, wherein the judging puts ruled line candidates having a starting point located within a predetermined range from a first y-coordinate, an ending point located within a predetermined range from a second y-coordinate and a same number of ruled line elements and ruled line candidates having a starting point located within a predetermined range from a first x-coordinate, an ending point located within a predetermined range from a second x-coordinate and a same number of ruled line elements into the group of regular ruled line candidates.

13. The computer-readable medium according to claim 2, wherein the determining extracts a ruled line candidate contained in a predetermined region located in the vicinity of each ruled line candidate judged as unstable in the judging out of the ruled line candidates judged as stable in the judging and defines a value between the parameter value indicating the properties of the ruled line candidate and a threshold value of the first requirement as a threshold value of the second requirement.

14. A ruled line extracting apparatus that extracts a ruled line in an image of a document, comprising:

an extraction section that extracts a ruled line candidate from the image of a document according to a first requirement predefined to be met by figures of elements of the ruled lines;

a judgment section that judges if the ruled line candidate is stable or unstable according to a structural stability of the ruled line candidate extracted by the extraction section;

a requirement determination section that determines a second requirement to be met by the figures of the elements of the ruled line different from the first requirement according to the ruled line candidate judged as stable by the judgment section and the first requirement; and a re-extraction section that re-extracts a ruled line candidate according to the second requirement determined by the requirement determination section.

15. The apparatus according to claim 14, wherein the first requirement includes a parameter range showing the range of an element parameter that indicates properties of a graphic to be selected as a ruled line element of the ruled line and/or the range of a consolidation parameter that indicates properties of the graphic of the ruled line element to be consolidated as ruled line candidate.

16. The apparatus according to claim 15, wherein the extraction section is adapted to select a graphic that makes the element parameter to be found within the corresponding parameter range from the document image and consolidate a plurality of ruled line elements that make the consolidation parameter to be found within the corresponding parameter range to generate the ruled line candidate.

17. The apparatus according to claim 16, wherein the ruled line is a broken ruled line;

the parameter range of the element parameter is defined by a threshold value for sizes of circumscribed rectangles of black pixel link components; and the extraction section being is adapted to extract the black pixel link components from a document image expressed by a binary system and select the black pixel link components that make the element parameter to be found within the corresponding parameter range as ruled line elements.

18. The apparatus according to claim 16, wherein the ruled line is a broken ruled line;

the parameter range of the consolidation parameter is defined by a threshold value for a gap separating two ruled line elements, a threshold value for a drift in the direction perpendicular to the direction of consolidating two ruled line elements and/or a threshold value for the number of consolidated ruled line elements; and the extraction section being is adapted to select a plurality of ruled line elements that make the consolidation parameter to be found within the parameter range as ruled line candidate.

19. The apparatus according to claim 16, wherein the ruled line is a solid ruled line; and the extraction section is adapted to divide a document image expressed by a binary system into a plurality of regions, select regions that make the element parameter to be found within the parameter range out of the regions as ruled line elements and consolidate the ruled line elements to generate a ruled line candidate.

20. A ruled line extracting method of extracting a ruled line in a document image of a document, the method comprising:

using an extraction section for extracting a ruled line candidate from the document image by executing a labeling process on the document image and selecting the ruled line candidate which is a black pixel link component satisfying a first requirement predefined to be met by figures of elements of the ruled lines;

using a judging section for judging if the ruled line candidate is stable or unstable according to the structural stability of the ruled line candidate extracted in the extracting;

using a requirement determination section for determining a second requirement to be met by the figures of the elements of the ruled line different from the first requirement according to the ruled line candidate judged as stable in the judging and the first requirement; and using a re-extraction section for re-extracting a ruled line candidate according to the second requirement determined in the determining.

* * * * *